United States Patent [19]
Goering et al.

[11] Patent Number: 6,041,583
[45] Date of Patent: Mar. 28, 2000

[54] HEIGHT SENSING SYSTEM FOR A HARVESTER HEAD

[75] Inventors: Kevin Jacob Goering, Cambridge; Jonathan Lee Engelstad, Ankeny, both of Iowa

[73] Assignee: Deere & Company, Moline, Ill.

[21] Appl. No.: 09/193,114

[22] Filed: Nov. 16, 1998

[51] Int. Cl.⁷ .................................................. A01D 34/28
[52] U.S. Cl. .................... 56/10.2 E; 56/208; 56/DIG. 10
[58] Field of Search ..................... 56/14.9, 15.8, 56/10.4, 34, 10.2 E, 33, 208, 209, 10.2 R, DIG. 10, DIG. 15; 172/7, 8; 364/424.07

[56] References Cited

U.S. PATENT DOCUMENTS

| | | | |
|---|---|---|---|
| 3,196,599 | 7/1965 | Meiners et al. | 56/10.2 E |
| 4,147,016 | 4/1979 | Jensen et al. | 56/15.8 |
| 4,211,057 | 7/1980 | Dougherty et al. | 56/10.2 E |
| 4,307,560 | 12/1981 | Swanson | 56/11.9 |
| 4,358,921 | 11/1982 | Pustejovsky | 56/34 |
| 4,641,490 | 2/1987 | Wynn et al. | 56/10.2 E |
| 4,733,523 | 3/1988 | Dedeyne et al. | 56/209 |
| 4,809,487 | 3/1989 | Junge et al. | 56/10.2 E |
| 5,115,628 | 5/1992 | Garter et al. | 56/10.2 E |
| 5,155,984 | 10/1992 | Sheehan | 56/10.2 E |
| 5,237,802 | 8/1993 | Fachini et al. | 56/10.2 E |
| 5,471,823 | 12/1995 | Panoushek et al. | 56/10.2 E |
| 5,535,577 | 7/1996 | Chmielewski et al. | 56/10.2 E |
| 5,633,452 | 5/1997 | Bebernes | 73/37 |
| 5,704,200 | 11/1995 | Chmielewski, Jr. et al. | 56/10.2 E |
| 5,713,190 | 2/1998 | Vermeulen et al. | 56/10.2 E |
| 5,937,621 | 6/1996 | Eggenhaus | 56/10.2 E |

*Primary Examiner*—Thomas B. Will
*Assistant Examiner*—Arpad Fabian Kovacs

[57] ABSTRACT

A harvester head, such as an ultra-narrow row cotton (UNRC) fingerhead, includes one or more rockshaft cylinders connected to a hydraulic circuit including first and second closed center valves connected to a shuttle valve to allow the rockshaft cylinders to be controlled by two separate height sensing shoes, one at each end of the head, which are not mechanically linked to each other. The closed center valves provide a positive displacement of oil to and from the rockshaft cylinders to control the height of the head. The shuttle valve provides head lift when either of the height sensing shoes indicates a raise condition and head lower only when both shoes indicate a lower condition. Electrohydraulic valves connect the source of hydraulic pressure on the harvester to the cylinders through the shuttle valve for operator selection of raise and automatic height control functions.

15 Claims, 1 Drawing Sheet

HEIGHT SENSING SYSTEM FOR A HARVESTER HEAD

BACKGROUND OF THE INVENTION

1) Field of the Invention

The present invention relates generally to head height control for an agricultural implement such as a cotton harvester, and, more specifically, to lift system for a high capacity stripper head which is automatically controlled by at least two transversely offset sensing shoes.

2) Related Art

Ultra-narrow row cotton (UNRC) strippers typically include a relatively wide fingerhead having narrowly spaced fingers. A typical fingerhead attachment is shown in U.S. Pat. No. 4,358,921 assigned to Allis-Chalmers. Cotton plants are directed between the fingers which remove the cotton bolls from the plants. Automatic height sensing systems typically are used to maintain the fingerhead close to the ground for efficient operation but far enough above the ground to prevent the fingers from digging into the dirt. Existing fingerhead height sensing systems use a constant flow hydraulic system wherein hydraulic fluid flows continuously through a valve to a hydraulic cylinder and then through a small orifice. The valve is tied to a ground sensing shoe through a mechanical linkage to control flow to and from the cylinder to maintain the fingers slightly above the ground. Such a system has several drawbacks. The constant oil flow through the orifice creates excess heat and wastes power. The orifices have to be sized to the weight of the head and are prone to plugging from contamination. Any change in the weight of the head or the viscosity of the oil changes the response of the head.

For relatively wide heads, at least two height sensing shoes are required, usually one at each end of the head, to assure that the head will lift over the highest ground in uneven conditions. Mechanically tying the two sensing shoes together becomes difficult, and some systems rely on relatively complicated electronic or hydraulic controls to assure proper head height control for wide heads operating on uneven terrain. Systems such as shown in U.S. Pat. No. 4,147,016 assigned to Deere & Company include a pair of independently operated cylinders for twisting the head to adjust the height of each of the ends in accordance with height sensing shoes at those ends. Maintaining fast, predictable response and precise control of a large head has been a continuing problem.

BRIEF SUMMARY OF THE INVENTION

It is therefore an object of the present invention to provide an improved head height control system for a harvester such as an UNRC stripper. It is a further object to provide such a height control system which overcomes most or all of the aforementioned problems.

It is a further object of the present invention to provide an improved head height control system which has an improved hydraulic circuit for controlling a wide, high capacity head. It is yet another object to provide such a system with a hydraulic circuit which reduces heat build up and power loss. It is yet a further object to provide such a system that has increased reliability and faster, more predictable response time as a result of elimination of continuous flow through a small orifice.

It is another object of the invention to provide a height control system for a relatively high capacity head, such as an UNRC head, having at least two independently operating height sensing shoes for precise height control without mechanical linkages connected between the two shoes. It is a further object to provide such a system having a hydraulic system with a shuttle valve which allows simple height control by the two shoes and two height control cylinders without complicated linkages or complicated electronic or hydraulic controls.

A harvester head, such as an UNRC fingerhead, includes one or more rockshaft cylinders connected to a hydraulic circuit including first and second closed center valves connected to a shuttle valve to allow the rockshaft cylinders to be controlled by two separate height sensing shoes, one at each end of the head. The closed center valves provide a positive displacement of oil to and from the rockshaft cylinders to control the height of the head. The shuttle valve provides head lift when either of the height sensing shoes indicates a raise condition and head lower only when both shoes indicate a lower condition. Electrohydraulic valves connect the source of hydraulic pressure on the harvester to the cylinders through the shuttle valve for selecting raise and automatic height control functions.

Precise height control is achieved by the system. The shuttle valve allows the head to be controlled by two widely spaced shoes that are not mechanically tied together. Excess heat and power consumption are avoided with the closed center valve system. The system has increased reliability as a result of elimination of continuous flow through a small orifice. A quicker response time can be achieved since small orifices are eliminated.

These and other objects, features and advantages of the present invention will become apparent to one skilled in the art upon reading the following detailed description in view of the drawings.

DETAILED DESCRIPTION OF THE DRAWINGS

Figure 1:
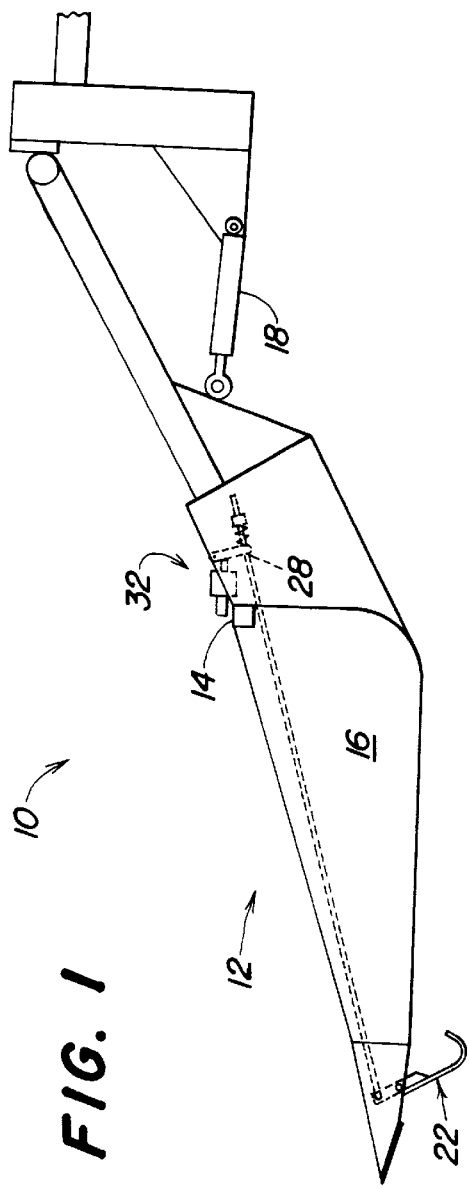
FIG. 1 is a side view of a portion of one side of a head, such as a UNRC stripper head, showing one of the two height sensing shoes attached.

Referring now to FIG. 1, therein is shown a portion of an UNRC harvester 10 including a finger stripper head 12. The head 12 includes a transversely extending frame 14 having opposite side portions 16. The head is connected to the harvester 10 for movement between lowered field-working and raised transport positions by a pair of rockshaft or single acting lift cylinders 18 connected in parallel with each other. The lift cylinders 18 also adjust the location of the head 12 relative to the ground when the head is in the field-working position.

Figure 2:
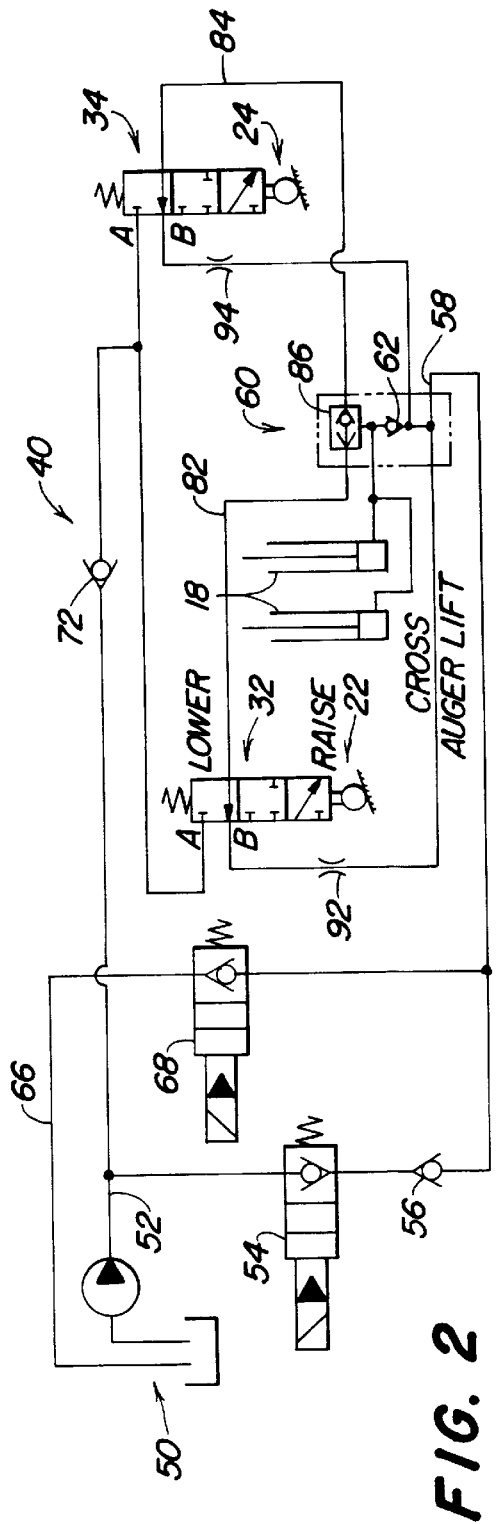
FIG. 2 is hydraulic circuit schematic showing a closed center hydraulic lift system for the head of FIG. 1.

The sides 16 support height sensing shoe assemblies 22 and 24 connected by linkage structures 28 to closed center hydraulic valves 32 and 34 which are part of a hydraulic control system shown schematically at 40 in FIG. 2. Each of the valves 32 and 34 has a raise position, a central neutral position, and a lower position and is controlled by the corresponding shoe assembly. When the sides 16 are properly positioned relative the ground, the shoe assemblies 22 and 24 maintain the valves 32 and 34 in the closed neutral (central) position. If one side 16 moves too close to the ground, the shoe assembly pivots in one direction and moves the corresponding valve to the raise position (up as shown in FIG. 2). If the side 16 moves too far above the ground, the shoe assembly pivots the opposite direction to move the valve to the lower position (down as shown in FIG. 2). The shoe assembly 22 and the valve 32 are not mechanically linked to the shoe assembly 24 and the valve 34 so each operates independently of the other.

The hydraulic control system 40 includes a source of hydraulic fluid 50 located on the harvester 10 having an output line 52 connected to an electrohydraulic operator control valve 54 for selectively raising the head 12. The valve 54 is connected through a one-way check valve 56 to an input 58 of a shuttle valve assembly 60. The input 58 is connected via check valve 62 to the base ends of the parallel connected cylinders 18. When the operator desires to lift the head 12, the electrohydraulic valve 54 is turned on to move the valve from the blocking position (shown) to the right to the open position so that the base ends of the cylinders 18 are pressurized via check valves 56 and 62. The cylinders 18 will extend to raise the head 12 regardless of the position of the valves 32 and 34.

The source 50 includes a return line 66 to reservoir connected by an electrohydraulic valve 68 to the input 58 of the shuttle valve assembly 60. To operate the system in an automatic height control mode, the operator activates the valve 68 to move it from the blocking position (shown) to the right to the open position wherein the input 58 is returned to reservoir.

The pressurized output line 52 is connected through a one way check valve 72 to inputs A of the control valves 32 and 34, respectively. The valves 32 and 34 have single output lines connected by lines 82 and 84 to opposite inputs of a shuttle valve 86 in the assembly 60. The output of the shuttle valve 86 is connected to the base ends of the cylinders 18. In the lower position (shown) and the neutral (central) position of the valves 32 and 34, the inputs A are blocked so no hydraulic fluid flows through the valves. If one of the valves, valve 32 for example, is moved to the raise position by the corresponding shoe assembly 22, the line 32 will be pressurized and the shuttle valve 86 will communicate the pressurized fluid to the base ends of the cylinder 18 to raise the head. The shuttle valve 86 assures that if either or both of the valves 32 and 34 are in the raise position, the cylinders 18 will extend to raise the head 12.

The input 58 connected to the valves 54 and 68 is also connected to inputs B of the valves 32 and 34 by via restrictors 92 and 94 so that when the electrohydraulic control valve 68 is in the automatic control mode (on and moved to the right), the inputs B will be returned to reservoir through the line 66. With the valve 68 on and the valves 32 and 34 in the lower position as shown in FIG. 2, hydraulic fluid will flow from the base ends of the cylinders 18 through the shuttle valve 86, through the valves 32 and 34 and the restrictors 92 and 94 so the head 12 lowers. As soon as one or both of the valves 32 and 34 is moved by the corresponding shoe assembly 22 or 24 to the neutral position, flow from the base ends of the cylinders 18 is blocked to prevent further lowering of the head. Movement of the ball in the check valve 86 prevents flow out of the base ends when only one of the valves 32 and 34 is in the lower position. However, movement of the either of the valves 32 or 34 to the raise position causes the cylinders 18 to extend to raise the head 12, even if the other of the valves 32 or 34 is in the lower position.

In operation, assuming that the head 12 is lowered and the operator wishes the raise the head for transport, the electrohydraulic valve 68 is turned off to block return flow to reservoir through the line 66. The valve 54 is turned on so that hydraulic fluid flow is directed through the check valves 56 and 62 to extend the cylinders 18. Once the head 12 is raised to the desired position, the valve 54 may be turned off. To lower the head 12 and operate in the automatic height sensing mode, the valve 68 is turned on to return the input port 58 to reservoir through the line 66. The cylinders 18 will retract and the head 12 will lower until one or both of the valves 32 and 34 is moved to the neutral position by the corresponding height sensing shoe assembly 22 or 24. If either or both of the valves 32 or 34 is moved to the raise position, the cylinders 18 will extend until neither of the valves are in the raise position.

Having described the preferred embodiment, it will become apparent that various modifications can be made without departing from the scope of the invention as defined in the accompanying claims.

We claim:

1. In a harvester adapted for forward movement over a field of plants, the harvester including a high capacity head for simultaneously removing the crop from numerous transversely spaced plants, the head having transversely spaced first and second ends, and operable cylinder structure for raising and lowering the head, a height control system comprising:

first and second height sensing shoes connected adjacent the respective first and second ends;

first and second closed center hydraulic valves connected to a source of hydraulic fluid on the harvester and to the first and second height sensing shoes, respectively, for movement between raise, lower and neutral positions;

a shuttle valve connected between the first and second closed center hydraulic valves and the cylinder structure, the shuttle valve operating the cylinder structure to raise the head when either or both of the closed center hydraulic valves are in the raise position.

2. The height control system as set forth in claim 1 wherein the height sensing shoes are independently operable.

3. The height control system as set forth in claim 1 further including an electrohydraulic valve connected between the source of hydraulic fluid and the first and second closed center hydraulic valves, the electrohydraulic valve having a height sensing condition for facilitating lowering of the head until one of the hydraulic valves moves to the neutral position.

4. The height control system as set forth in claim 3 further comprising a second electrohydraulic valve connected between the source and the shuttle valve, the second electrohydraulic valve having a raise position for operating the cylinders to raise the head regardless of the position of the first and second closed center hydraulic valves.

5. The height control system as set forth in claim 1 including first and second one way check valves connected between the source and the first and second hydraulic valves.

6. In a harvester adapted for forward movement over a field of plants, the harvester including a high capacity head for simultaneously removing the crop from numerous transversely spaced plants, the head having transversely spaced first and second ends, and operable cylinder structure including a cylinder for raising and lowering the head and for controlling the height of the head, a control system comprising:

first and second height sensing shoes connected adjacent the respective first and second ends;

first and second closed center hydraulic valves connected to a source of hydraulic fluid on the harvester and to the first and second height sensing shoes, respectively, for movement between raise, lower and neutral positions;

a shuttle valve connected between the first and second closed center hydraulic valves and the cylinder structure, the shuttle valve operating the cylinder structure to raise the head when either or both of the closed center hydraulic valves are in the raise position and to lower the head only when both the valves are in the lower position; and selective control valve structure connected between the source and the hydraulic valves for raising the head independently of the hydraulic valves.

7. The control system as set forth in claim 6 further comprising one way check valve structure connected between the source and the hydraulic valves and facilitating raising of the head when either of the hydraulic valves is in the raise position.

8. The control system as set forth in claim 6 wherein the cylinder structure comprises a single acting cylinder having a base end connected to the shuttle valve.

9. The control system as set forth in claim 6 wherein the selective control valve structure includes a blocking valve connected between the source and the hydraulic valves and having a raise position for directing hydraulic fluid to the cylinder structure.

10. The control system as set forth in claim 9 wherein the selective control valve structure further comprises a second blocking valve having a first position preventing lowering of the head and a second position providing automatic head height position.

11. In a narrow row cotton stripper adapted for forward movement over a field of cotton plants, the stripper including a high capacity head for simultaneously removing the crop from numerous transversely spaced plants, the head having transversely spaced first and second ends, and operable cylinder structure for raising and lowering the head, a height control system comprising:

first and second mechanical height sensing shoes connected adjacent the respective first and second ends for providing indications of the distance of the ends above the ground;

first and second hydraulic valves connected to a source of hydraulic fluid on the harvester and to the first and second height sensing shoes, respectively, for movement between raise, lower and neutral positions in response to the indications;

a shuttle valve connected between the first and second hydraulic valves and the cylinder structure, the shuttle valve preventing lowering of the head by the cylinder structure when one of the hydraulic valves is in the raise or neutral position;

selective control valve structure connected between the source and the hydraulic valves for raising the head regardless of the position of the hydraulic valves; and including a check valve connected between the shuttle valve and the selective control valve structure for facilitating raising of the head with the selective control valve structure and preventing lowering of the head by the selective control valve structure when either of the hydraulic valves is in the raise position.

12. The height control system as set forth in claim 11 wherein the cylinder structure includes a pair of single acting cylinders having base and rod ends and connected in parallel, and the shuttle valve is connected to the base end of the cylinders.

13. The height control system as set forth in claim 11 wherein the first and second hydraulic valves comprise three position, closed center valves.

14. The height control system as set forth in claim 11 further including a second check valve connected between the source and the first and second hydraulic valves and facilitating raising of the head when either of the first and second hydraulic valves is in the raise position.

15. The height control system as set forth in claim 13 wherein the cylinder structure includes a single acting cylinder, and the closed center valves each have a single output line connected to the shuttle valve.

\* \* \* \* \*